United States Patent
Johnson et al.

(10) Patent No.: US 6,593,390 B1
(45) Date of Patent: Jul. 15, 2003

(54) RADIATION CURABLE INK JET INK COMPOSITIONS

(75) Inventors: Steve Johnson, Cheshire (GB); Jill Woods, Peterborough (GB)

(73) Assignee: XAAR Technology Limited, Cambridge (GB)

( * ) Notice: Subject to any disclaimer, the term of this patent is extended or adjusted under 35 U.S.C. 154(b) by 0 days.

(21) Appl. No.: 09/575,868

(22) Filed: May 19, 2000

Related U.S. Application Data

(63) Continuation of application No. PCT/GB98/03627, filed on Dec. 4, 1998.

(30) Foreign Application Priority Data

Dec. 5, 1997 (GB) ................................................ 9725929

(51) Int. Cl.⁷ ...................... C09D 11/00; C09D 11/10; C08F 2/50
(52) U.S. Cl. ...................... 522/74; 522/81; 522/83; 522/75; 522/91; 522/99; 522/182
(58) Field of Search .............. 522/75, 81, 83, 522/99, 182, 181, 74, 91

(56) References Cited

U.S. PATENT DOCUMENTS

| | | | |
|---|---|---|---|
| 4,303,924 A | 12/1981 | Young, Jr. | .................. 346/1.1 |
| 4,331,704 A * | 5/1982 | Watson, Jr. et al. | |
| 5,059,266 A | 10/1991 | Yamane et al. | ................ 156/64 |
| 5,270,368 A | 12/1993 | Lent et al. | ................... 524/236 |
| 5,275,646 A | 1/1994 | Marshall et al. | .......... 106/20 B |

FOREIGN PATENT DOCUMENTS

| | | |
|---|---|---|
| EP | 0 071 345 A2 | 2/1983 |
| EP | 0 465 039 A1 | 1/1992 |
| EP | 0 540 203 A1 | 5/1993 |
| EP | 0 652 555 A2 | 5/1995 |
| GB | 2233928 | 1/1991 |
| JP | 60-132767 | 7/1985 |
| JP | 63-102936 | 5/1988 |
| WO | WO 97/31071 | 8/1997 |
| WO | WO 98/16590 | 4/1998 |
| WO | WO 98/27171 | 6/1998 |

* cited by examiner

*Primary Examiner*—Susan W. Berman
(74) *Attorney, Agent, or Firm*—Marshall, Gerstein & Borun

(57) ABSTRACT

A radiation curable ink jet ink having a viscosity not greater than 35 mPa.s at 30° C. and comprising a colorant component, a diluent consisting essentially of reactive liquid material and, optionally, at least one photopolymerization catalyst and wherein the reactive liquid material is formed of both monofunctional and polyfunctional material and comprises 5 to 30% by weight of at least one oligomer.

32 Claims, No Drawings

RADIATION CURABLE INK JET INK COMPOSITIONS

This is a continuation of International Application No. PCT/GB98/03627 filed Dec. 4, 1998, the entire disclosure of which is incorporated herein by reference.

This invention relates to ink jet ink compositions and in particular to such compositions which are curable by ultraviolet radiation.

Radiation curable inks e.g. for screen printing and offset printing have been known for some time and more recently, there have been proposals for radiation-curable ink jet inks; see, for example, GB-A-2233928, JP-A-63102936, U.S. Pat. No. 4,303,924, EP-A-0540203, EP-A-0465039 and WO97/31071. There are, however, substantial problems in arriving at a radiation-curable formulation which meets all the criteria required of an ink jet ink; specifically, low viscosity, the required level of surface tension, low volatility, long term stability, rapid drying of the ink dot derived from the droplet ejected from the nozzle of the print head, and the provision of print of satisfactory quality, especially resistance to scratching and adhesion to the substrate.

We have now developed a radiation curable ink jet ink which is essentially free of non-reactive diluent and yet has the desired viscosity, surface tension, volatility, stability and drying rate and produces print of acceptable quality. Inks according to the invention thus can be printed without difficulty from ink jet printers to give good quality print on a variety of substrates including such disparate materials as paper and non-adsorbent materials e.g. metal. They are of particular interest, however, in printing on plastics which are difficult to print on, e.g. polyolefins such as polyethylene and polypropylene.

According to one aspect of the present invention, there is provided a radiation curable ink jet ink having a viscosity not greater than 35 mPa.s at 30° C. as measured using a Brookfield Viscometer fitted with a small sample adaptor having a No. 18 spindle and at a rotational speed of 60 rpm, giving a shear rate of 79.2 $sec^{-1}$, and comprising a colorant component, a diluent consisting essentially of reactive liquid material and, optionally, at least one photopolymerisation catalyst and wherein the reactive liquid material is formed of both monofunctional and polyfunctional material and comprises from 5 to 30% by weight of at least one oligomer.

By consisting essentially of reactive liquid material, we mean that the diluent is free or substantially free of non-reactive components; that is to say, if any non-reactive liquid component is present in the diluent it forms no more than 1% by weight of the ink, preferably not more than 0.5%, by weight.

By reactive material we mean material containing one or more unsaturated carbon-carbon bonds polymerisable by radiation. In accordance with the invention, the reactive material comprises a mixture of monomer and oligomer. Oligomer is sometimes known as prepolymer. Non-limiting examples of monomers are acrylates, methacrylates and alkoxylated and polyalkoxylated derivatives thereof. Non-limiting examples of oligomers (prepolymers) are polyester-, urethane- and epoxy-acrylates.

Preferably, said at least one oligomer has an equivalent weight of at least 180. Print obtained from inks containing oligomer exhibits improved toughness, adhesion and/or scratch resistance as compared with print derived from the same ink composition but excluding oligomer.

Preferably, the oligomer is liquid so as to maintain the desired low viscosity of the ink and preferably it has a functionality greater than 1. If it is not liquid, it should be soluble in the liquid components of the reactive material. In any event, the oligomer is deemed to form part of the reactive liquid material.

In another preferred embodiment, the ink composition includes a silicone derivative containing carbon-carbon unsaturation which is polymerisable by radiation, to adjust the surface tension of the ink. This polymerisable silicone derivative, if present, is also deemed to form part of the reactive liquid material.

While the possibility of formulating the compositions of the invention to be cured using other radiation sources, e.g. electron beam, is not excluded, the compositions are preferably formulated to be curable by visible, or more preferably ultra violet, light, in which case they will usually include at least one photoinitiator.

The components of the compositions of the invention will now be described in greater detail.

The colorant is preferably thermally stable and water-insoluble. While the possibility of using colorants such as dyes, which are soluble in the diluent is not excluded, it is preferred to use those, such as pigments, which are insoluble, especially where light-fastness is important. In this case, it may be desirable to include a dispersant in the composition to stabilise the dispersion of insoluble colorant in the diluent.

Examples of insoluble colorants include, in particular, carbon black and those colorants characterised as pigment dyes in The Colour Index.

Examples of suitable pigments include those within the ranges having the following CI classifications:

| Colour | CI Number |
| --- | --- |
| Green | PG 7 and 36 |
| Orange | PO 5, 34, 36, 38, 43, 51, 60, 62, 64, 66, 67 and 73 |
| Red | PR 112, 149, 170, 178, 179, 185, 187, 188, 207, 208, 214, 220, 224, 242, 251, 254, 255, 260 and 264 |
| Magenta/Violet | PV 19, 23, 31, and 37 and PR 122, 181 and 202 |
| Yellow | PY 17, 120, 138, 155, 168, 175, 179, 180, 181 and 185 |
| Blue | PB 15 |
| Black | PB 2, 5 and 7. |

Examples of specific pigments include IRGALITE BLUE GLVO, MONASTRAL BLUE FGX, IRGALITE BLUE GLSM, HELIOGEN BLUE L7101F, LUTETIA CYANINE ENJ, HELIOGEN BLUE L6700F, MONASTRAL GNXC, MONASTRAL GBX, MONASTRAL GLX, MONASTRAL 6Y, IRGAZIN DPP ORANGE RA, NOVAPERM ORANGE H5G70, NOVPERM ORANGE HL, MONOLITE ORANGE 2R, NOVAPERM RED HFG, HOSTAPERM ORANGE HGL, PALIOGEN ORANGE L2640, SICOFAST ORANGE 2953, IRGAZIN ORANGE 3GL, CHROMOPTHAL ORANGE GP, HOSTAPERM ORANGE GR, PV CARMINE HF4C, NOVAPERM RED F3RK 70, MONOLITE RED BR, IRGAZIN DPP RUBINE TR, IRGAZIN DPP SCARLET EK, RT-390-D SCARLET, RT-280-D RED, NOVAPERM RED HF4B, NOVAPERM RED HF3S, NOVAPERM RD HF2B, VYNAMON RED 3BFW, CHROMOPTHAL RED G, VYNAMON SCARLET 3Y, PALIOGEN RED L3585, NOVAPERM RED BL, PALIOGEN RED 3880 HD, HOSTAPERM P2GL, HOSTAPERM RED P3GL, HOSTAPERM RED E5B 02, SICOFAST RED L3550, SUNFAST MAGENTA 122, SUNFAST RED 122, SUNFAST VIOLET 19 228-0594, SUNFAST VIOLET 19 228-1220, CINQUASIA VIOLET RT-791-D, VIOLET R NRT-201-D, RED B NRT-796-D, VIOLET R RT-101-D, MONOLITE VIOLET 31, SUNFAST MAGENTA 22, MAGENTA RT-243-D, MAGENTA RT 355-D, RED B RT-195-D, CINQUASIA CARBERNET RT-385-D, MONOLITE VIOLET R, MICROSOL VIOLET R, CHROMOPTHAL VIOLET B, ORACET PINK RF, IRGALITE YELLOW 2GP, IRGALITE YELLOW WGP, PV FAST YELLOW HG, PV FAST YELLOW H3R, HOSTAPERM YELLOW H6G, PV FAST YELLOW, PALIOTOL YELLOW D1155 and IRGAZIN YELLOW 3R.

Mixtures of colorants may be employed, if desired, including mixtures of dyes, mixtures of pigments and mixtures of one or more dyes with one or more pigments.

In one preferred embodiment of the invention, the colorants are chosen to give the widest range of colours and tones in a hexachrome system.

The amount of colorant employed in the ink will depend on the choice of colorant and the depth of colour required in the print, and can be established by simple experiment. In general, for pigments it will fall within the range 0.01% to 50% by weight, the amount chosen being such that viscosity of the ink does not exceed 35 mPa.s. For organic pigments the amount will generally be in the range 0.01 to 10% weight, more preferably 0.05 to 6%, most preferably 0.05 to 3%.

Where the colorant comprises a pigment which is to be dispersed in the diluent, it preferably has a particle size of not greater than 1 $\mu$m maximum dimension and more preferably not greater than 0.5 $\mu$m. Even more preferably, the particles have a narrow size range distribution.

Where the ink comprises a dispersion of pigment, a dispersant will normally be required to aid or stabilise the dispersion. The choice of dispersant will depend upon the nature of the pigment and composition of the diluent. Examples of suitable materials may be found amongst dispersants sold under the trade names of Solsperse, EFKA and Byk. Mixtures of dispersants and mixtures of one or more dispersants with one or more dispersant synergists may be employed. The amount of dispersant employed (or dispersant and synergist where used) will depend upon the choice and concentration of the pigment. For organic pigments, the amount will usually be in the range 15 to 100% by weight of the pigment, preferably 20 to 75% by weight. For inorganic pigments, lower concentrations may be acceptable, e.g. 5% or less.

The reactive liquid material of the ink composition comprises both monofunctional and difunctional material. Preferably, it includes monofunctional, difunctional and tri- or higher functional material. By mono-, di-, tri- and higher functional material is meant compounds having, respectively, one, two, three or more unsaturated carbon-carbon groups which are polymerisable by radiation, especially but not exclusively ultra-violet light.

Examples of some suitable compounds may be found in the publication U.V. and E.B. Curing Formulations for Printing Inks, Coatings and Paints, edited by R. Holman and published by SITA-Technology, London, in 1984 and The Printing Ink Manual, Fourth Edition, published by VNR International, However, the choice of suitable compound is not limited to the compounds or classes of compounds disclosed in those publications. It is preferred to use compounds of low volatility, low viscosity and high reactivity. For the desired reactivity, therefore, it is generally preferred to employ compounds wherein the unsaturated carbon-carbon groups are vinyl $CH_2=CH-$, with a lesser preference for vinylidene $CH_2=C<$. Particularly preferred are acrylates and methacrylates; however as methacrylates tend to be less active than the corresponding acrylates, they preferably form only a small proportion of the diluent where they are used.

The monofunctional material may comprise a single monomer or a mixture of monomers. Straight chain acrylates of lower alcohols (e.g. $C_{1-4}$ alcohols) tend to be too volatile and therefore should form only a small proportion of the reactive liquid material or be avoided. Acrylates of branched chain alcohols e.g. isodecyl alcohol are less volatile but more preferred are acrylates of cyclic or polycyclic alkanols, e.g. tetrahydrofurfuryl acrylate and isobornyl acrylate. Examples of the monofunctional acrylates that may be used include long chain aliphatic acrylates e.g. wherein the aliphatic group contains at least 8, preferably at least 10 carbon atoms, such as lauryl acrylate and stearyl acrylate, and acrylates of alkoxylated alcohols e.g. 2-(2-ethoxyethoxy)ethyl acrylate. The monofunctional material need not necessarily be an acrylate; for example N-vinyl-2-pyrrolidone may be used. Further examples of monofunctional monomers are Sartomer CD 9050 (a monofunctional acid ester) and Sartomer CD 611 (an ethoxylated tetrahydrofuran acrylate).

So that the desired amounts of polyfunctional material may be incorporated into the ink, the overall viscosity of the monofunctional material of the diluent preferably is as low as possible, e.g. 20 mPa.s or less, more preferably 16 mPa.s or less, at 30° C.

The difunctional material, which may comprise a single monomer or mixture of monomers, preferably has a viscosity not greater than 30 mPa.s, and preferably not greater than 20 mPa.s, at 30° C. Preferred components are diacrylates of glycols and polyglycols, especially propylene glycol and polypropylene glycols e.g. di-, tri- and higher propylene glycols. Di-acrylates of tri- or higher hydric alcohols may also be used. Examples of such diacrylates having a viscosity at 30° C. of not greater than 20 mPa.s are the diacrylates of 1,4-butanediol, neopentylglycol, propoxylated neopentyl glycol, diethylene glycol, hexanediol, dipropylene glycol, tripropylene glycol, triethylene glycol and polyethylene glycols.

The tri- or higher functional material may also comprise a single monomer or a mixture of monomers. Alkoxylated acrylates such as those obtained by acrylating the products of ethoxylating or propoxylating an initiator containing three or more active hydrogen atoms are particularly preferred. Examples of initiators having three or more active hydrogen atoms include glycerol, trimethylol propane, pentaerythritol and neopentyl alcohol. Examples of such alkoxylated acrylates are ethoxylated trimethylol propane triacrylates, propoxylated glyceryl triacrylates, Sartomer SR 9008 (an alkoxylated trifunctional acrylate ester) and propoxylated pentaerythritol tetraacrylates. Other examples of tri- or higher functional monomers are tris (2-hydroxyethyl) isocyanurate triacrylate, and Sartomer SR 9012 (a trifunctional acrylate ester). Preferably compounds having relatively low viscosities, e.g. 200 mPa.s or less at 30° C., are chosen so that amounts towards the upper end of the range of 10 to 30% by weight, may be employed in the diluent.

While compounds having a functionality higher than 3 may also be used, they should be included at most in only small amounts, the maximum tolerable amount being less as the functionality of the compound increases. This is because as the functionality increases, so does the crosslink as the functionality increases, so does the crosslink density in the cured product unless the molecular weight of the compound is increased but increase in molecular weight tends to lead to an increase in the viscosity of the compound.

As indicated above, the reactive liquid material must also include at least one oligomer containing unsaturated carbon-carbon bonds polymerisable by radiation. Preferably, the oligomeric component of the reactive liquid material, which may comprise one or more oligomers, has a functionality greater than 1 and thus consists of a component having, or mixture of components at least one of which has, at least two unsaturated carbon-carbon bonds polymerisable by radiation. More preferably the functionality of the oligomeric component is greater than 2. The equivalent weight of each oligomer is preferably at least 180, more preferably at least 200 or 220. However, in general, increase in equivalent weight is accompanied by increase in viscosity, thus restricting the amount of the oligomer that may be included in the composition. Preferably therefore, the equivalent weight does not exceed 750 and more preferably does not exceed 500.

As in the case of the other reactive components, oligomers which are polyacrylates are preferred because of their relatively low viscosity compared with other oligomeric polyfunctional materials. Examples include the polyfunctional products of acrylating hydroxy-terminated polyesters, known as polyester acrylates, the polyfunctional products of acrylating urethane oligomers, known simply as urethane acrylates, and epoxy acrylates. Alkoxylated acrylates are not regarded as oligomers.

It appears that there is an optimum concentration for the oligomeric material beyond which the improvement in properties is marginal. Since increasing the concentration tends to increase viscosity, it is generally not desirable to employ more than this optimum amount which will vary according to the choice of the oligomeric material and of the other components of the reactive liquid material. In general, this optimum will not exceed 30%, of the reactive liquid material and will generally be not more than 25% e.g. 10 to 22%, more generally 15 to 20%, by weight of the total amount of reactive liquid material in the ink.

The reactive liquid material should be essentially of low volatility and preferably substantially non-volatile at ambient temperatures and preferably also at the printhead temperature if above ambient.

A silicone derivative containing at least one radiation-polymerisable carbon-carbon unsaturation is a preferred component of the ink composition for reducing its surface tension, especially when the ink is intended for printing on plastics with low surface tension surfaces e.g. polyolefins and ABS. Preferably, it is employed in amount to give a surface tension below 35 dynes/cm and generally in the range 25 to 35 dynes/cm. In general, the silicone derivative will be used in amounts of 0.05–0.15 to 1–3% by weight, depending on the molecular weight of the derivative, more preferably 0.1 to 0.6% by weight of the ink. The inclusion of the silicone derivative in such quantities also reduces the tendency to blocking of sheets printed with the ink and improves dot definition. While greater amounts may further reduce surface tension, other properties are likely to be adversely affected. Examples of suitable compounds are silicone acrylates e.g. acrylates of organo modified silicones, for example organo modified polysiloxanes e.g. comprising repeating units of the structure

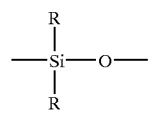

where each R is a monovalent hydrocarbyl group, e.g. methyl or phenyl, and at least one unit of the structure

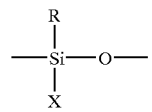

where R is as defined above and X contains an acrylate ($CH_2=CH_1COO—$) group. In one preferred embodiment, the acrylate group is connected to the silicon atom via an alkoxy or polyalkoxy group. Preferably the chosen silicone derivative will have one or two radiation-polymerisable unsaturated carbon-carbon bonds. While the silicone component is deemed to be part of the reactive liquid material of the composition, as the amount of the silicone derivative used in the composition is relatively small, it may be ignored when calculating relative amounts of mono-, di- and/or tri- or higher functional material in the reactive liquid material.

As stated above, it is preferred that the reactive liquid material contains monofunctional, difunctional and tri- or higher functional components. The total amount of monofunctional material in the ink (including monofunctional oligomer if present) will generally form at least 20%, e.g. from 20 to 60% by weight, preferably from 20 to 50% by weight, and more preferably from 40 to 50% by weight of the total reactive material in the ink. If less than about 20% is employed, the viscosity of the ink may be too high for some purposes. If, on the other hand, the amount significantly exceeds 60%, the properties of the print, and in particular abrasion resistance and hardness may suffer, and also the rate and/or degree of cure of the ink may be reduced.

The balance of polyfunctional material in the reactive liquid diluent is preferably made up of both difunctional and tri- or higher functional components. The total amount of difunctional material (including difunctional oligomer, if present) is preferably at least 5% by weight of the total amount of reactive material in the ink. To achieve the desired combination of viscosity of the ink and flexibility of the print derived therefrom, preferably the difunctional material is present in an amount in the range 10 to 35% by weight of the total amount of reactive material in the ink, more preferably 17½ to 30% by weight, and most preferably 20 to 30% by weight.

The total amount of tri- or higher functional material in the ink (including tri- or higher functional oligomer; if present) is preferably greater than 10 but not more than 30% by weight of the total amount of reactive liquid material in the ink. Preferably it is present in an amount of at least 15% by weight and more preferably from 20 to 30% by weight. If used in an amount of less than 10% by weight, the properties of the print obtained from the ink, and in particular hardness and scratch resistance, may tend to suffer. On the other hand, if used in amounts of more than about 30% by weight, the viscosity of the ink tends to be too high and the print may become unacceptably brittle and inflexible.

It is preferred that the total of di- and higher functional material in the ink forms at least 35% of the total of reactive material in the ink.

A feature that is relevant to the control of the properties of the print derived from the ink, and in particular its physical properties such as hardness, abrasion resistance, modulus, flexibility and elasticity, is the overall functionality of the reactive material in the ink; i.e. the average number of radiation polymerisable unsaturated carbon-carbon bonds per molecule. If this value is too low, the print will be too soft but if it is too high, the print will tend to be brittle and to craze or crack when the substrate on which it has been printed is non-absorbent, e.g. as in a plastic substrate, and is flexed. Preferably, the amounts of mono-, di- and tri- and higher functional components of the ink are selected such that this value will be in the range 1.25 to 2, more preferably 1.25 to 1.85, most preferably 1.3 to 1.7.

While inks according to the invention may be formulated for curing by any suitable form of electromagnetic radiation, visible light or, more preferably, ultra-violet light is preferred and for this purpose the ink will also preferably include at least one photoinitiator. Conventional photoinitiators may be employed and the choice will depend upon the choice of colorant and the wave length of the radiation. Examples of suitable photoinitiators are:

2,2-dimethyl-2-hydroxy-acetophenone,
1-hydroxy-1-cyclohexyl-phenyl ketone,
2,2-dimethoxy-2-phenylacetophenone,
2-benzyl-2-dimethylamino-1-(4-morpholinophenyl)-butan-1-one,
2-methyl-1-[4-(methylthio)phenyl]-2-morpholino-propan-1-one,
2,4,6-trimethylbenzyl-diphenyl-phosphine oxide, 1-chloro-4-propoxythioxanthone,
Isopropyl thioxanthone(mixture of 2- and 4-isomers), Benzophenone,
Blends of bis(2,6-dimethoxybenzoyl)-2,4,4-trimethyl pentyl phosphine oxide and 1-phenyl-2-hydroxy-2-methyl propanone,
Blends of bis(2,6-dimethoxybenzoyl)-2,4,4-trimethyl pentyl phosphine oxide and 1-hydroxy-cyclohexyl-phenyl ketone,
bis(2,4,6-trimethylbenzoyl)phenylphosphine oxide, and Camphorquinone.

In order to obviate, so far as possible, the obscuring effect of the colorant, especially where this is a pigment, a mixture of photoinitiators is preferably used whose peak energy absorbtion levels are at different wave lengths within the range of the selected radiation. In the inks of the present invention, preferential absorption of incident UV radiation by the pigments leads to depletion of the available energy for the photoinitiator(s). This can place considerable constraints on the cure speed and level of conversion achievable especially with black pigmented ink formulations. It is therefore preferred to employ photoinitiator blends which are sensitive to the wavelengths not absorbed, or only partially affected, by the pigments. Typically this "absorption window" is between 350–400 nm.

The initiators will generally be used in amounts of from about 3 to about 15% more usually about 5 to about 10% by weight of the ink.

Activators, e.g. co-initiators or amine synergists, for the photoinitiators may also be included, if desired. Examples include ethyl-4-(dimethylamino)benzoate, 2-ethylhexyl dimethylaminobenzoate, and dimethylaminoethyl methacrylate.

In operation, the ink is ejected from an ink jet printer and exposed to the selected radiation during its flight from the printhead to the substrate to be printed or, more preferably after deposition on the substrate. Generally speaking, the smaller the throw distance, that is the distance from the printhead to the substrate, the better the print quality. However it is preferably no less than 0.5 mm and even at distances of 1.5 mm or 2 mm or even higher, acceptable results may be obtained. For most applications, the preferred throw distance will be in the range 0.5 to 0.75 mm. Curing of the ink is aided by the absence of oxygen and thus it is preferred to provide an inert gas atmosphere, e.g. nitrogen over the substrate in the zone where the ink is exposed to the radiation. Curing is preferably effected using radiation in the UVA and near-visible frequencies.

Inks according to the invention may be formulated for use in any of the available kinds of continuous and drop-on-demand ink jet printers although in general they may not be suitable for use in apparatus which employs thermal means of droplet generation. In a continuous ink jet printer, for example, former kind, for example, ink droplets which are produced continuously may be passed through a charging area where individual droplets receive an electrical charge in response to a signal and are directed towards a substrate to be printed. The droplets then pass through an electrical field causing them to be deflected by an amount which is dependent on the intensity of the charge and the field. Droplets not required to form print on the substrate may be directed to a by-pass gutter. For inks of the present invention to be suitable for use in such printers, they are preferably conductive and it may therefore be necessary to include a suitable conducting additive. Drop-on-demand ink jet printers may be of the kind using an electrostatically accelerated ink jet or droplet sequences ejected by pressure impulse actuation, e.g. when each droplet is individually ejected from a nozzle by means of pressure pulses induced e.g. by means of a piezoelectric actuator acting on the ink in the channel supplying the nozzle.

The diluent, pigment(s), dispersant(s) (where present), dispersant synergist(s) (where present), photoinitiator(s) including activator(s) therefor (where present), and conducting additive (where present) will normally form at least 99% of the composition and preferably substantially the entire composition. As indicated above, preferably at least 99.5% by weight of the diluent is reactive liquid material.

The inks may be employed for printing on to a wide variety of substrates, both absorbent and non-absorbent including paper, glass, plastic and metal, e.g. steel, copper and aluminium, but are particularly suitable for printing on to plastics to provide a strongly bonded print of good definition and optical density, especially if the surface to be printed is pre-treated e.g. by flame, plasma etch or corona treatment to raise the surface energy. Preferably the surface energy should be at least about 36 dynes/cm and more preferably from 42 to 48 dynes/cm.

Examples of plastics on which the inks of the present invention have been successfully printed are polyolefins such as polyethylene (including high density polyethylene) and polypropylene, vinyl chloride polymers, ABS and foamed plastics such as expanded polystyrene.

The invention is now illustrated but in no way limited by the following Examples, in which all parts are expressed as parts by weight except where otherwise indicated.

EXAMPLE 1

The compositions set out in Table 1 below were formulated into inks in the manner now described.

Preparation of Millbase

The pigment was ground, with the appropriate amount of hyperdispersant to ensure minimum millbase viscosity, using conventional bead milling techniques. The millbase so formed was processed until a fine particle dispersion was obtained. The particle grind was assessed by visual microscopy and a filterability test. The finished millbase was removed from the grinding media using an appropriately sized mesh either by pressure or gravity.

Preparation of Ink from Millbase

All the following blending operations were carried out in opaque vessels (either amber glass or stainless steel) using an electrically operated high speed mixer fitted with a stainless steel rotor blade. A homogenous mixture was formed of the reactive diluent(s) and oligomers. The photoinitiator(s), either in solid or liquid form, were then added and stirring/heating continued until all insoluble components dissolved. The millbase was then carefully added to the stirred/heated vehicle in a manner to avoid any unwanted 'shock' crystal seeding/growth. Finally, the silicone polyether acrylate was added and stirring/heating continued until visual homogeneity was achieved.

The ink composition so formed was filtered using a proprietary cartridge filter rated at 1 micron absolute filter rating. Following bottling a retained sample was analysed for viscosity, visual appearance, cure rate, surface tension and ageing at elevated temperature (60° C.).

The viscosities of the ink compositions were all in the range 15–20 cps measured using a Brookfield Viscometer at 30° C. and their values for surface tension were all in the range of 26–28 dynes/cm.

The inks were used to form coloured print on moulded ABS cards using a 128 channel greyscale drop-on-demand printhead of the kind described for example in EP-A-0.277.703 and EP-A-0.278.590 with a nozzle diameter of 25 μm and a distance of 2 mm between the printhead and the card.

Curing was by means of a Fusion F300s UV Lamp with a 152 mm (6 inch) long "D bulb" at 11.8 w/mm (300 w/inch) using cure energies in the range 1-3 J/cm$^2$. Curing was complete within one second.

The print was well defined with acceptable colour density. The cyan, magenta and black inks all exhibited colour densities greater than 1.5 and were typically about 1.8. The colour density of the yellow ink was greater than 1, typically 1.1.

The print exhibited good adhesion to the card and good scratch resistance. Scratching with a fingernail did not remove the print and on further testing of adhesion by scoring and crosslinking the print with a scalpel and attempting to remove it by applying Sellotape to the scored surface and then peeling off the Sellotape, no detectable removal of ink was observed. The hardness of the print was assessed in conventional manner using pencils of different hardnesses. The hardness is determined as the lowest hardness value to form a scratch on the print. Print formed from the inks of the present invention generally exhibited hardnesses of 6H–7H.

The print remained unaffected when the card was subjected to the dynamic bending stress test in accordance with International Standard ISO/IEC 10 372.

TABLE 1

|  | BLACK | CYAN | MAGENTA | YELLOW | CYAN | MAGENTA |
| --- | --- | --- | --- | --- | --- | --- |
| ACTILANE 430 | 10% | 10.00% | 10% | 10% | 10% | 10% |
| ACTILANE 251 | 15% | 15.00% | 15% | 15% | 15% | 15% |
| TEGORAD 2200 | 0.40% | 0.40% | 0.40% | 0.40% | 0.40% | 0.40% |
| ISOBORNYL ACRYLATE | 39.70% | 40.00% | 38.35% | 41.48% | 40.85% | 41.47% |
| SARTOMER 306 | 23.00% | 22.90% | 23.00% | 22.0% | 23.67% | 23.00% |
| SPEEDCURE ITX | 2.00% | — | — | — | — | — |
| QUANTACURE EHA | 3% | — | — | — | — | — |
| IRGACURE 907 | 5.00% | — | — | — | — | — |
| REGAL 250R | 1.50% | — | — | — | — | — |
| SOLSPERSE 24000 | 0.38% | 0.60% | 0.75% | 0.30% | 0.03% | 0.03% |
| SOLSPERSE 5000 | 0.03% | 0.11% | — | — | 0.01% | — |
| IRGALITE BLUE GLVO | — | 1.00% | — | — | 0.05% | — |
| HOSTAPERM RED | — | — | 2.50% | — | — | 0.10% |
| PALITOL YELLOW | — | — | — | 0.75% | — | — |
| SOLSPERSE 22000 | — | — | — | 0.07% | — | — |
| LUCERIN TPO | — | 5.00% | 5.00% | 5.00% | 5.00% | 5.00% |
| DAROCURE 1173 | — | 5.00% | 5.00% | 5.00% | 5.00% | 5.00% |
| SPEEDCURE EDB | — | — | — | — | — | — |
| IRGACURE 369 | — | — | — | — | — | — |

KEY:
Actilane 430 - trimethylpropane ethoxylate triacrylate (ex Akcros)
Actilane 251 - trifunctional urethane acrylate prepolymer (ex Akcros)
TegoRad 2200 - silicone polyether acrylate (ex Tego Chemie Service)
Isobornyl acrylate (Ex Cray Valley Products)
Sartomer 306 - tripropylene glycol diacrylate (ex Cray Valley Products)
Speedcure ITX - isopropylthioxanthone (ex Lambsons)
Speedcure EDB - ethyl 4-(dimethylamino)benzoate (ex Lambsons)
Irgacure 369 -2-benzyl-2-diethylamino-1-(4-morpholinophenyl)-butanone-1
Solsperse 5000/22000/24000 - hyperdispersants (ex Zeneca)
Regal 250R - carbon black, C.I. pigment black 7 (ex Cabot)
Irgalite Blue GLVO - copper phthalocyanine, C.I, pigment blue 15:4 - (ex Ciba Geigy)
Hostaperm Red ESB 02 - quinacridone, C.I. pigment violet 19 - (ex Hoechst)
Paliotol Yellow - isoindoline, C.I. pigment yellow 185 - (ex BASF)
Quantacure EHA -2-ethylhexyl p-dimethylaminobenzoate (ex Great Lakes)
Irgacure 907 - 2-methyl-1-(4-methylthio)phenyl-2-morpholino-propan-1-one (ex Ciba Geigy)
Darocure 1173 - 1-phenyl-2-hydroxy-2-methylpropane (ex Merck)
Lucirin TPO - 2,4,6-trimethylbenzoyl-diphenyl-phosphine oxide (ex BASF).

The functionality of the reactive material of each of the above formulations was approximately 1.5.

EXAMPLE 2

In the same manner as Example 1, a further series of ink jet ink formulations were prepared having the compositions set out in Table 2 below. Coloured print was formed from the inks in the manner described in Example 1 and similar results were obtained.

TABLE 2

|  | ORANGE | VIOLET | GREEN |
|---|---|---|---|
| ACTILANE 430 | 10% | 9.55% | 10% |
| ACTILANE 251 | 15% | 14.32% | 15% |
| TEGORAD 2200 | 0.40% | 0.38% | 0.40% |
| ISOBORNYL ACRYLATE | 39% | 21.41% | 38.8% |
| N-VINYL PYRROLIDONE | — | 19.09% | — |
| SARTOMER 306 | 23% | 23.37% | 23% |
| SPEEDCURE ITX | — | — | — |
| QUANTACURE EHA | — | — | — |
| IRGACURE 907 | — | — | — |
| REGAL 250R | — | — | — |
| SOLSPERSE 24000 | 0.6% | 0.535% | 0.64% |
| SOLSPERSE 5000 | — | 0.135% | 0.16% |
| CROMOPHTHAL ORANGE GP | 2% | — | — |
| CROMOPHTHAL VIOLET B | — | 1.67% | — |
| MONASTRAL GNX-X | — | — | 2% |
| SOLSPERSE 22000 | — | — | — |
| LUCERIN TPO | 5% | 4.77% | 5% |
| DAROCURE 1173 | 5% | 4.77% | 5% |
| SPEEDCURE EDB | — | — | — |
| IRGACURE 369 | — | — | — |

EXAMPLE 3

In the same manner as described in Example 1, a further series of ink jet ink formulations were prepared having the compositions set out in Table 3.

Coloured print was formed from the inks in the manner described in Example 1 and similar results were obtained.

TABLE 3

|  | BLACK | CYAN | MAGENTA | YELLOW |
|---|---|---|---|---|
| ACTILANE 430 | 12.50% | 12.50% | 12.50% | 12.50% |
| ACTILANE 251 | 12.50% | 12.50% | 12.50% | 12.50% |
| TEGORAD 2200 | 0.40% | 0.40% | 0.40% | 0.40% |
| SARTOMER 506* | 39.70% | 40.00% | 38.35% | 41.48% |
| SARTOMER 306 | 23.00% | 22.90% | 23.00% | 22.0% |
| SPEEDCURE ITX | 2.00% | — | — | — |
| QUANTACURE EHA | 3.00% | — | — | — |
| IRGACURE 907 | 5.00% | — | — | — |
| REGAL 250R | 1.50% | — | — | — |
| SOLSPERSE 24000 | 0.38% | 0.60% | 0.75% | 0.30% |
| SOLSPERSE 5000 | 0.03% | 0.11% | — | — |
| IRGALITE BLUE GLVO | — | 1.00% | — | — |
| HOSTAPERM RED ESB 02 | — | — | 2.50% | — |
| PALIOTOL YELLOW D1155 | — | — | — | 0.75% |
| SOLSPERSE 22000 | — | — | — | 0.07% |
| LUCERIN TPO | — | 5.00% | 5.00% | 5.00% |
| DAROCURE 1173 | — | 5.00% | 5.00% | 5.00% |

*Sartomer 506 is isobornyl acrylate (ex Cray Valley Products)

EXAMPLE 4

In a series of further experiments it was found that incrementally replacing the Actilane 251 by Actilane 430 reduced the scratch resistance of the resultant cured print when tested following ASTM test method D 3363-92a, although merely increasing the Actilane 430 to 14% while reducing the Actilane 251 to 11% made no apparent difference to the scratch resistance.

If the Actilane 251 is completely replaced by Actilane 430 the print derived from the composition tends to be too soft for many applications.

If the amount of Actilane 251 is increased to 25% or 30% at the expense of Actilane 430 and Sartomer 306 the viscosity tends to increase without a sufficiently concomitant beneficial increase in physical properties.

EXAMPLE 5

A white ink was prepared having the following formulation:

| Actilane 422 | 18.55% |
|---|---|
| Actilane 251 | 15% |
| N-vinyl pyrrolidone | 20% |
| Solsperse 24000 | 1.05% |
| Tegorad 2200 | 0.4% |
| Irgacure 907 | 10% |
| White pigment | 35% |

Actilane 422 is dipropylene glycol diacrylate (ex Akcros). The white pigment is Tioxide TR92.

White print was formed from the ink in the manner described in Example 1 and similar results were obtained.

What is claimed is:

1. A radiation-curable ink jet ink, in a liquid and uncured form having a viscosity not greater than 35 mPa.s at 30° C. as measured using a Brookfield Viscometer fitted with a small sample adaptor having a No. 18 spindle and a rotational speed of 60 rpm, giving a shear rate of 79.2 $sec^{-1}$, said ink comprising a colorant component, a diluent consisting essentially of reactive liquid material, a silicon derivative containing carbon-carbon unsaturation which is polymerizable by radiation and, optionally, at least one photopolymerization catalyst, wherein the reactive liquid material comprises both monofunctional material having a single unsaturated carbon-carbon bond polymerizable by radiation and polyfunctional material having a plurality of unsaturated carbon-carbon bonds polymerizable by radiation, the reactive liquid material further comprises 5% to 30% by weight, based upon the total weight of the reactive liquid material, of at least one oligomer having at least one unsaturated carbon-carbon bond polymerizable by radiation, wherein the reactive liquid material comprises at least 20% by weight, based upon the total weight of the reactive liquid material, of the monofunctional material.

2. An ink jet ink of claim 1 wherein said at least one oligomer forms not more than 25% by weight of the reactive liquid material.

3. An ink jet ink of claim 1 wherein the colorant comprises a pigment dispersed in the diluent.

4. An ink jet ink of claim 1 wherein the reactive liquid material comprises components selected from the group consisting of acrylates, methacrylates, and N-vinyl pyrrolidone.

5. An ink jet ink of claim 1 wherein said reactive liquid material comprises monofunctional, difunctional and trifunctional or higher functional components.

6. An ink jet ink of claim 1 wherein the monofunctional material of the diluent comprises at least one monomer selected from the group consisting of long chain aliphatic acrylates, acrylates of branched chain alcohols, acrylates of alkoxylated alcohols, acrylates of cyclic alkanols, acrylates of polycyclic alkanols, and N-vinyl pyrrolidone.

7. An ink jet ink of claim 6 wherein the monofunctional material comprises isobornyl acrylate.

8. An ink jet ink of claim 1 wherein the monofunctional material forms not more than 50% by weight of the reactive liquid material.

9. An ink jet ink of claim 1 wherein at least 5% by weight of the reactive liquid material comprises difunctional material.

10. An ink jet ink of claim 1 wherein greater than 10% by weight but not more than 30% by weight of the reactive liquid material comprises trifunctional material or higher functional material.

11. An ink jet ink of claim 1 comprising two or more photoinitiators.

12. An ink jet ink of claim 1 wherein at least one photoinitiator promotes cure in the frequency range 350 nm to 400 nm.

13. A method of printing on a substrate comprising the steps of directing an ink of claim 1 from a printhead of an ink jet printer toward a print-receiving surface of said substrate and, during its travel from the printhead to the substrate and/or after deposition on the substrate, exposing the ink to radiation to cure the ink.

14. A printed substrate having a surface carrying print comprising a cured ink of claim 1.

15. A printed substrate of claim 14 wherein the surface is plastic.

16. A radiation-curable ink jet ink, in a liquid and uncured form, having a viscosity not greater than 35 mPa.s at 30° C. as measured using a Brookfield Viscometer fitted with a small sample adaptor having a No. 18 spindle and a rotational speed of 60 rpm, giving a shear rate of 79.2 sec$^{-1}$, said ink comprising a colorant component, a diluent consisting essentially of reactive liquid material and, optionally, at least one photopolymerization catalyst, wherein the reactive liquid material comprises:

monofunctional monomeric material having a single unsaturated carbon-carbon bond polymerizable by radiation;

polyfunctional monomeric material having a plurality of unsaturated carbon-carbon bonds polymerizable by radiation; and 5% to 30% by weight, based upon the total weight of the reactive liquid material, of at least one oligomer having at least one unsaturated carbon-carbon bond polymerizable by radiation;

wherein the reactive liquid material comprises at least 20% by weight, based upon the total weight of the reactive liquid material, of the monofunctional material, including monofunctional oligomer material;

wherein greater than 10% by weight but not more than 30% by weight of the reactive liquid material comprises trifunctional monomer material or higher functional monomer material.

17. An ink jet ink of claim 16 further including a silicone derivative containing carbon-carbon unsaturation which is polymerizable by radiation.

18. An ink jet ink of claim 16 wherein said at least one oligomer forms not more than 25% by weight of the reactive liquid material.

19. An ink jet ink of claim 18 further including a silicone derivative containing carbon-carbon unsaturation which is polymerizable by radiation.

20. An ink jet ink of claim 16 wherein the colorant comprises a pigment dispersed in the diluent.

21. An ink jet ink of claim 16 wherein the reactive liquid material comprises components selected from the group consisting of acrylates, methacrylates, and N-vinyl pyrrolidone.

22. An ink jet ink of claim 16 wherein said reactive liquid material comprises monofunctional, difunctional and trifunctional or higher functional components.

23. An ink jet ink of claim 16 wherein the monofunctional material of the diluent comprises at least one monomer selected from the group consisting of long chain aliphatic acrylates, acrylates of branched chain alcohols, acrylates of alkoxylated alcohols, acrylates of cyclic alkanols, acrylates of polycyclic alkanols, and N-vinyl pyrrolidone.

24. An ink jet ink of claim 23 wherein the monofunctional material comprises isobornyl acrylate.

25. An ink jet ink of claim 16 wherein the monofunctional material forms not more than 50% by weight of the reactive liquid material.

26. An ink jet ink of claim 16 wherein at least 5% by weight of the reactive liquid material comprises difunctional material.

27. An ink jet ink of claim 16 wherein greater than 10% by weight but not more than 30% by weight of the reactive liquid material comprises trifunctional material or higher functional material.

28. An ink jet ink of claim 16 comprising two or more photoinitiators.

29. An ink jet ink of claim 28 wherein at least one photoinitiator promotes cure in the frequency range 350 nm to 400 nm.

30. A method of printing on a substrate comprising the steps of directing an ink of claim 16 from a printhead of an ink jet printer toward a print-receiving surface of said substrate and, during its travel from the printhead to the substrate and/or after deposition on the substrate, exposing the ink to radiation to cure the ink.

31. A printed substrate having a surface carrying print comprising a cured ink of claim 16.

32. A printed substrate of claim 31 wherein the surface is plastic.

* * * * *